United States Patent
Carter et al.

(10) Patent No.: US 11,509,756 B1
(45) Date of Patent: Nov. 22, 2022

(54) HEADSET CASE WITH SMARTPHONE HOLDER

(71) Applicant: Plantronics, Inc., Santa Cruz, CA (US)

(72) Inventors: Benjamin Alvarado Carter, Santa Cruz, CA (US); Jacob T. Meyberg Guzman, Santa Cruz, CA (US)

(73) Assignee: Plantronics, Inc., Santa Cruz, CA (US)

( * ) Notice: Subject to any disclaimer, the term of this patent is extended or adjusted under 35 U.S.C. 154(b) by 0 days.

(21) Appl. No.: 17/339,781

(22) Filed: Jun. 4, 2021

(51) Int. Cl.
| | |
|---|---|
| *H04M 1/04* | (2006.01) |
| *H04B 1/3888* | (2015.01) |
| *A45C 11/00* | (2006.01) |
| *H04R 1/10* | (2006.01) |

(52) U.S. Cl.
CPC .............. *H04M 1/04* (2013.01); *A45C 11/00* (2013.01); *H04B 1/3888* (2013.01); *H04R 1/1025* (2013.01); *A45C 2011/001* (2013.01)

(58) Field of Classification Search
CPC .... H04M 1/04; A45C 11/00; A45C 2011/002; H04B 1/3888; H04R 1/1025
See application file for complete search history.

(56) References Cited

U.S. PATENT DOCUMENTS

| | | | | |
|---|---|---|---|---|
| 10,701,472 B1 * | 6/2020 | Xu | ........................ | H02J 7/0044 |
| 2013/0206612 A1 * | 8/2013 | Chun | ................... | H04R 1/1033 |
| | | | | 206/38 |

FOREIGN PATENT DOCUMENTS

| | | | | |
|---|---|---|---|---|
| CN | 212811981 U | * | 3/2021 | |
| KR | 200454927 Y1 | * | 8/2011 | |
| KR | 102113123 B1 | * | 5/2020 | |
| SU | 2738123 C1 | * | 12/2020 | ............. A45C 11/00 |

OTHER PUBLICATIONS

Amazon, "BackBeat PRO 5100 True Wireless Bluetooth Earbuds", https://www.amazon.com/BackBeat-5100-Wireless-Bluetooth-Earbuds/dp/B07V9ZMDX7, Sep. 4, 2019, 11 pages.
Poly, "Voyager 5200 Charge Case", https://www.poly.com/us/en/products/headsets/accessories/voyager-5200-charge-case, Jan. 1, 2021, 3 pages.

* cited by examiner

*Primary Examiner* — Keith Ferguson
(74) *Attorney, Agent, or Firm* — Ferguson Braswell Fraser Kubasta PC

(57) ABSTRACT

A headset case includes a base providing a cavity for stowing a headset, the base including a bottom region configured to rest on a surface; a lid; and a hinge pivotably connecting the lid to the base. When the headset case is in a closed configuration, the lid covers the cavity. When the headset case is in an open configuration, a first section of the lid at least partially rests on the surface, and a second section of the lid, extending from the first section of the lid, is configured to prop up a smartphone by mechanically supporting the smartphone leaning against the second section of the lid while resting on the base.

20 Claims, 7 Drawing Sheets

HEADSET CASE WITH SMARTPHONE HOLDER

BACKGROUND

Headsets such may be stowed in headset cases. A headset may be stowed for protection and/or for charging while not in use. Accordingly, it is not uncommon for a user of a headset to also carry a headset case, e.g., while traveling, when working, etc.

SUMMARY

In general, in one aspect, one or more embodiments relate to a headset case comprising: a base providing a cavity for stowing a headset, the base comprising a bottom region configured to rest on a surface; a lid; and a hinge pivotably connecting the lid to the base, wherein when the headset case is in a closed configuration: the lid covers the cavity, and wherein when the headset case is in an open configuration: a first section of the lid at least partially rests on the surface, and a second section of the lid, extending from the first section of the lid, is configured to prop up a smartphone by mechanically supporting the smartphone leaning against the second section of the lid while resting on the base.

In general, in one aspect, one or more embodiments relate to a headset case comprising: a base providing a cavity for stowing a headset, the base comprising a bottom region configured to rest on a surface; a lid comprising a first section and a second section extending from the first section at an angle of less than 90°; and a hinge pivotably connecting the lid to the base, wherein when the headset case is in a closed configuration: the lid covers the cavity, and wherein when the headset case is in an open configuration: the first section of the lid at least partially rests on the surface, and the second section of the lid extends in an upward direction from the surface.

In general, in one aspect, one or more embodiments relate to a headset case comprising: a base providing a cavity for stowing a headset, the base comprising a plurality of ledges extending beyond the cavity; a lid; and a hinge pivotably connecting the lid to the base, wherein when the headset case is in a closed configuration: the lid covers the cavity, and wherein when the headset case is in an open configuration: the lid is configured to prop up a smartphone by mechanically supporting the smartphone leaning against the lid while resting on the base and in contact with the plurality of ledges.

Other aspects of the disclosure will be apparent from the following description and the appended claims.

DETAILED DESCRIPTION

Figure 1A:
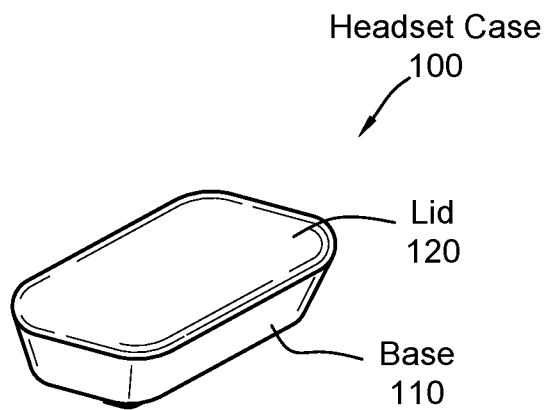
FIG. 1A shows a perspective view of headset case in a closed configuration, in accordance with one or more embodiments of the disclosure.

Specific embodiments of the disclosure will now be described in detail with reference to the accompanying figures. Like elements in the various figures are denoted by like reference numerals for consistency.

In the following detailed description of embodiments of the disclosure, numerous specific details are set forth in order to provide a more thorough understanding of the disclosure. However, it will be apparent to one of ordinary skill in the art that the disclosure may be practiced without these specific details. In other instances, well-known features have not been described in detail to avoid unnecessarily complicating the description.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

Further, although the description includes a discussion of various embodiments of the disclosure, the various disclosed embodiments may be combined in virtually any manner. All combinations are contemplated herein.

In general, embodiments of the disclosure provide a headset case for headset device stowage that is also configured to hold a smartphone for viewing. The headset case may be with or without headset charging functionality. Headset cases may be available for various types of headsets such as earbuds, single ear Bluetooth headsets, and all other types of wireless and wired headsets. In one or more embodiments, the headset case is further configured to serve as a support for a smartphone. The headset case may prop up a smartphone in a position and/or orientation suitable for a user to watch content (e.g., watching a movie), to perform video calls, etc., without the user having to hold the phone, or leaning the phone against another object. With headsets being a commonly used accessory, many users may also carry a headset case for stowing and/or charging the headset. These users may, thus, also benefit from the smartphone support provided by the headset case.

Various different designs of headset cases designed to function as a smartphone support, in accordance with one or more embodiments, are subsequently described with reference to the figures.

Figure 1B:
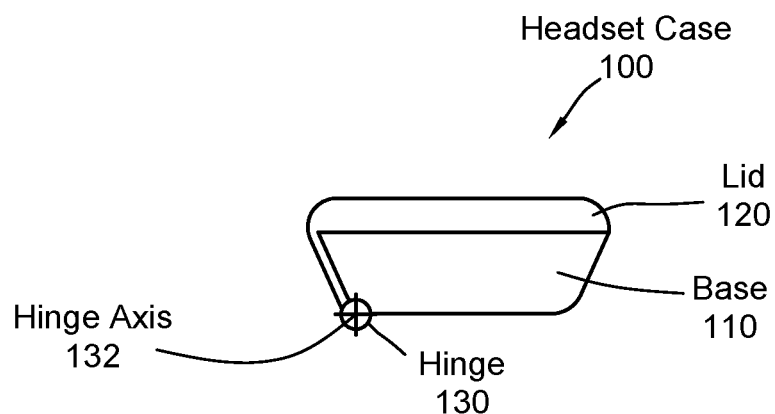
FIG. 1B shows a side view of a headset case in a close configuration, in accordance with one or more embodiments of the disclosure.
Figure 1C:
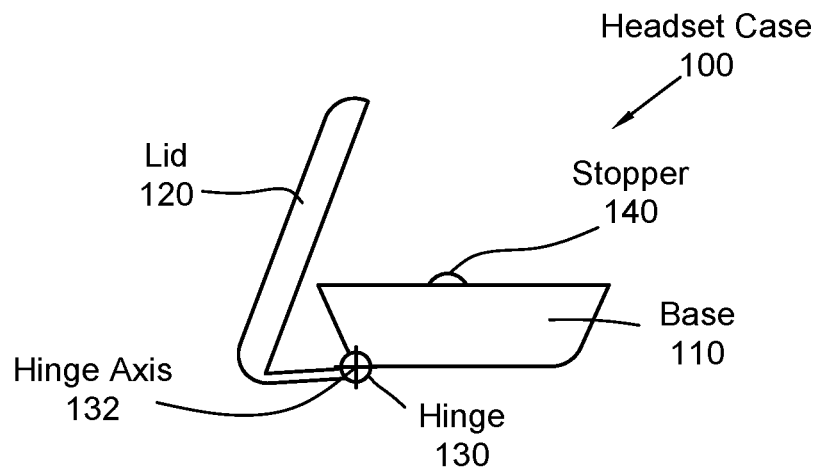
FIG. 1C shows a side view of a headset case in an open configuration, in accordance with one or more embodiments of the disclosure.
Figure 1D:
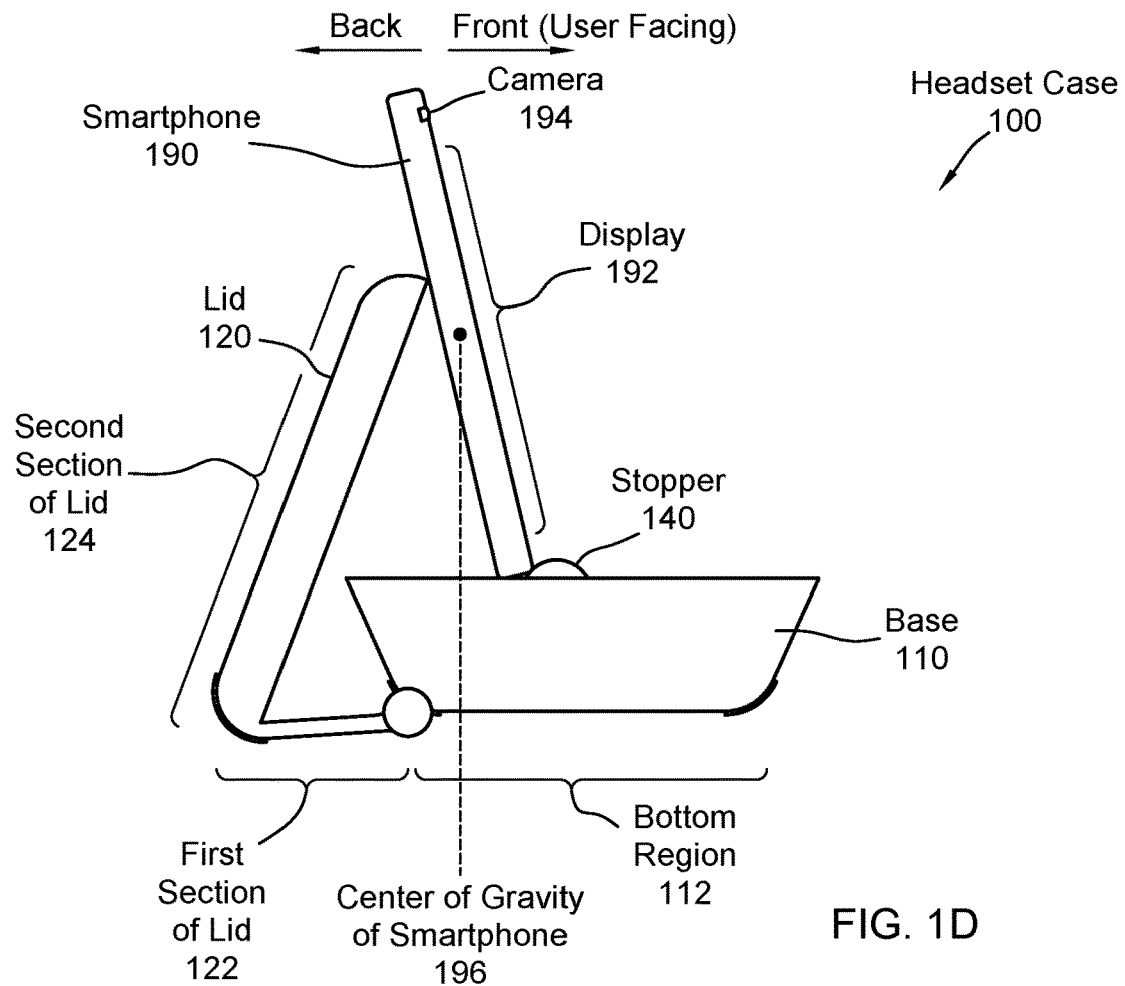
FIG. 1D shows a side view of a headset case supporting a smartphone, in accordance with one or more embodiments of the disclosure.
Figure 1E:
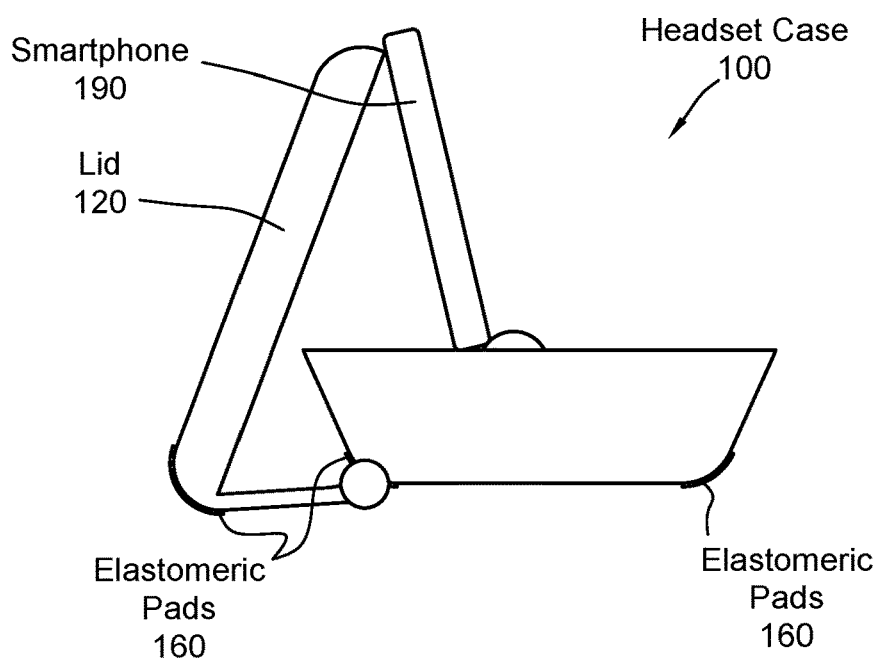
FIG. 1E shows a side view of a headset case supporting a smartphone, in accordance with one or more embodiments of the disclosure.

Turning to FIGS. 1A-1E, different views of a headset case (100), in accordance with one or more embodiments, are provided. FIG. 1A shows a perspective view of headset case (100) in a closed configuration, FIG. 1B shows a side view of a headset case (100) in a closed configuration, FIG. 1C shows a side view of a headset case (100) in an open configuration, FIG. 1D shows a side view of a headset case (100) supporting a smartphone, and FIG. 1E shows a side view of a headset case (100) supporting a smartphone. The headset case (100) may or may not include charging functionality for a headset.

In one or more embodiments, the headset case (100) includes a base (110) and a lid (120). The base (110) may form a cavity (212, in FIG. 2C) within the base for stowing a headset (not shown). The base (110) may include structural materials (e.g., foam padding) to fixate and/or cushion the headset in the base. The base may further include additional components, e.g., a battery (not shown), a charging circuit (not shown) for charging the headset, etc. The base (110) may further be configured to accommodate components in addition to the headset, e.g., a Bluetooth dongle. The base may have a bottom region (112) that may rest on a surface, e.g., a desk.

In one or more embodiments, one or more hinges (130) pivotably connect the lid (120) to the base (110). In a closed configuration of the headset case (100) (e.g., FIGS. 1A, 1B), the lid (120) covers the cavity provided by the base (110), thus protecting the content of the headset case (100), e.g., the headset. In an open configuration of the headset case (100) (e.g., FIGS. 1C, 1D, 1E), the content of the headset case is accessible. Further, in one or more embodiments, when in the open configuration, the lid (120) may serve as a support for a smartphone (190), as further discussed below.

The transition between the closed configuration and the open configuration of the headset case (100) may be initiated by a user opening or closing the headset case (100). To open or close the headset case (100), the user may pivot the lid (120) about a hinge axis (132) provided by the hinge(s) (130). The hinge(s) (130) may further implement a mechanical stop for the lid (120) in the open configuration. When in the open configuration, the mechanical stop may hold the lid (120) at an orientation that is suitable for propping up a smartphone. Additional details are discussed below. The hinge (130) may be spring-loaded (e.g. using a cam-spring mechanism) to arrest the lid (120) in either the open configuration or in the closed configuration.

Now specifically referring to FIGS. 1D, and 1E, a headset case (100) supporting a smartphone (190) in a user-facing position, in accordance with one or more embodiments, is shown. More specifically, when the smartphone (190) is supported by the headset case (100), with a display (192) and optionally a camera (194) on the front of the smartphone (190) facing a user, the smartphone (190) may be supported by the lid (120) on the back of the smartphone. While supported by the lid (120), the bottom edge of the smartphone (190) may rest on the base (110). To stabilize the smartphone (190) in the user-facing position, in one or more embodiments, the base (110) includes one or more stoppers (140). The one or more stoppers (140) inhibit or prevent the bottom edge of the smartphone (190) to slide relative to the base (110), in a forward direction toward the user. The stoppers are separate and distinct from any closing mechanism of the headset case (100). The stopper(s) (140) may have any shape suitable for keeping the smartphone (190) in the user-facing position. Further, if multiple stoppers are used, the multiple stoppers may be collinear with each other such that a line through the stoppers is parallel to a front of the headset case in one or more embodiments.

In one embodiment, the stopper(s) (140) form a mechanical barrier extending beyond the cavity provided by the base (110). The front of the smartphone may be in contact against the stopper(s) (140). Thus, the stopper(s) (140) prevent or inhibit a sliding of the smartphone in the forward direction. For example, the stoppers(s) may include isolated point-like protrusions and/or ledges of any shape. Other features may be used to prevent sliding. For example, a groove in the base (110) may accommodate the bottom edge of the smartphone, or the friction of a rubberized and/or textured pad on the base (110) may prevent sliding.

In one or more embodiments, the geometry of the base (110), the lid (120), and the stoppers(s) (140) is select such that the smartphone (190), in the user-facing position, faces the user at a lean angle that is suitable for certain uses of the smartphone (190). The lean angle is the angle at which the smartphone (190) leans against the lid (120) when supported by the headset case (100). Namely, the lean angle is the angle of the smartphone with respect to an axis perpendicular to the base or a vertical axis. A detailed definition of the lean angle is provided below in reference to FIG. 2B. For example, when the headset case (100) is in a substantially horizontal position (e.g., when placed on a desk), the display (192) smartphone (190) may be angled slightly upward to facilitate viewing of the display (192) by the user. Similarly, the camera (194) may also be angled slightly upward to capture the user's face, e.g. during a video call. Additional details regarding the positioning of the smartphone (190) on the headset case (100) are provided in reference to FIGS. 2A, 2B, and 2C.

The headset case (100) may support the smartphone (190) in a portrait mode and in a landscape mode. Assume that, as illustrated in FIG. 1D, the base (110) has a bottom region (112). The bottom region (112) is configured to rest on a surface, e.g., a desk. To provide a more stable support for the smartphone (190) by the headset case (100), in one or more embodiments, the lid (120) includes a bottom region extension formed by a first section (122) of the lid (120). When the headset case (100) is in the open configuration, the addition of the first section (122) to the bottom region (112) establishes a wider area available for support of the headset case (100) resting on a surface. The wider area causes the center of gravity (196) of the smartphone (190) to be located more centrally relative to the combined area of the bottom region (112) and the first section (122). The risk of the headset case (100) tipping over, particularly when supporting a smartphone in portrait mode, is thus reduced. A second section (124) of the lid (120) extends from the first section (122). The second section, as shown, for example, in FIGS. 1C and 1D, extends in an upward direction and is configured to prop up the smartphone (190) by mechanically supporting the smartphone leaning against the second section (123) of the lid (120) while resting on the base (110). In one or more embodiments, the angle between the first section (122) and the second section (124) is less than 90°. The selected angle may ensure that the center of gravity (196) of the smartphone (190) is within the combined area of the bottom region (112) and the first section (122) and/or that the smartphone (190) is at the desired lean angle. When the headset case (100) is in the closed configuration, the second section covers the cavity in the base (110). Further, in one or more embodiments, when the headset case (100) is in the closed configuration, the first section (122) of the lid (120) is pivoted upward to form a side wall of the base (110), as may be seen, for example, in FIG. 1B.

The bottom region (112) and/or the first section (122) of the lid (120) may have a surface structure or additional element that increases friction and/or to provide a vibration damping. The vibration damping may be particularly beneficial when using the smartphone (190) as a speakerphone. For example, the bottom region (112) and/or the bottom region extension (150) may be equipped with pads, e.g., elastomeric pads (160) or felt pads, configured to face a surface on which the headset case (100) may rest.

Figure 2A:
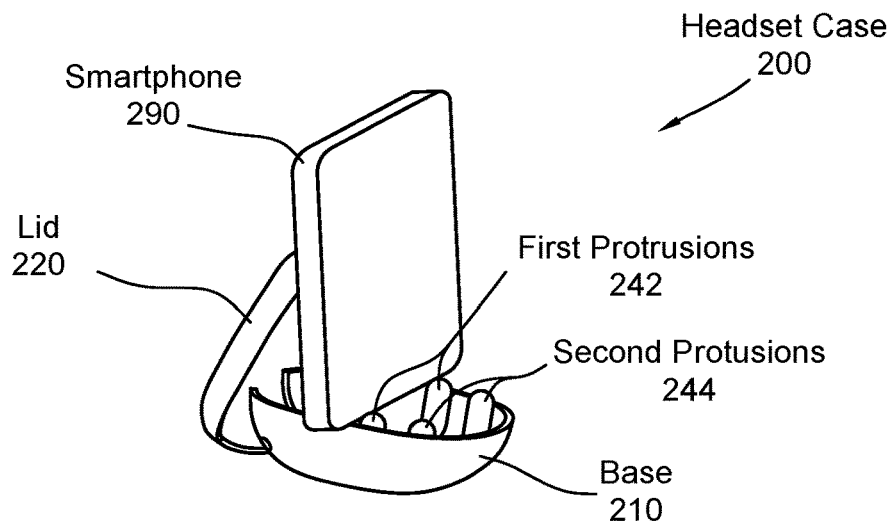
FIG. 2A shows a perspective view of a headset case supporting a smartphone, in accordance with one or more embodiments of the disclosure.
Figure 2B:
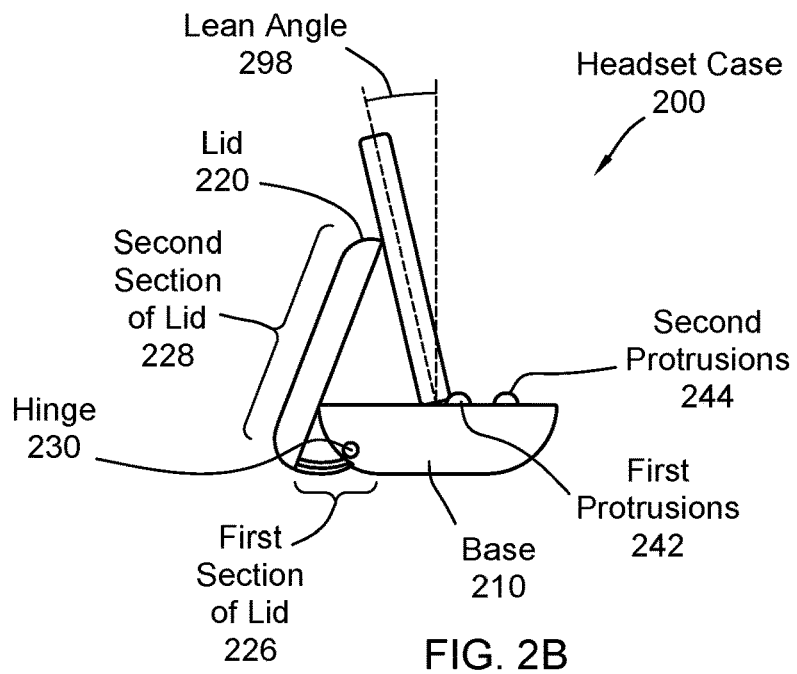
FIG. 2B shows a side view of a headset case supporting a smartphone, in accordance with one or more embodiments of the disclosure.
Figure 2C:
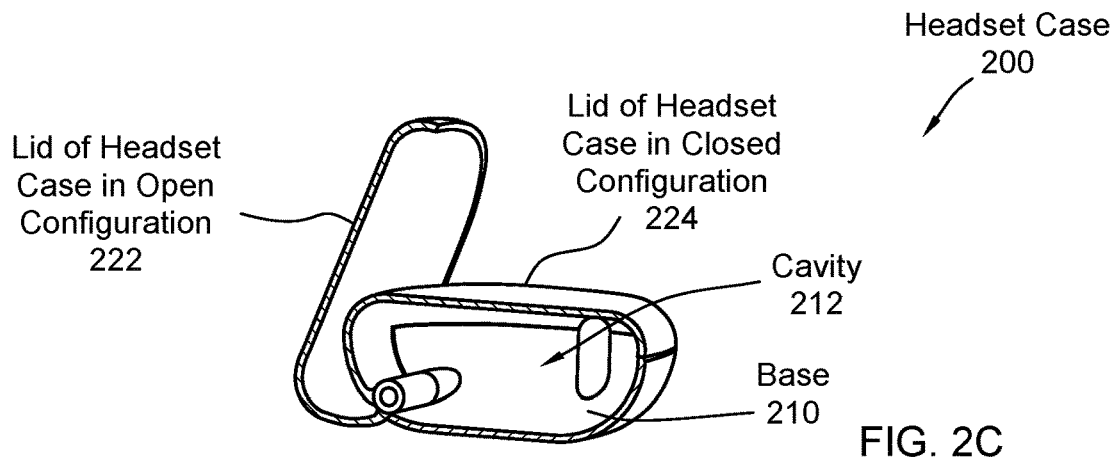
FIG. 2C shows a cross sectional view of a headset case, in accordance with one or more embodiments of the disclosure.

Turning to FIGS. 2A-2C, different views of a headset case (200), in accordance with one or more embodiments, are provided. FIG. 2A shows a perspective view of a headset case supporting a smartphone, FIG. 2B shows a side view of a headset case supporting a smartphone, and FIG. 2C shows a cross sectional view of a headset case.

Similar to the previously described headset case (100), the headset case (200) includes a base (210) and a lid (220) pivotably connected to the base (210) by a hinge (230). As previously described and as shown in FIG. 2C, the headset case (200) may be in an open configuration (222) or in a closed configuration (224). The lid (220) may include a first section (226) and a second section (228), as previously described for the embodiments of FIGS. 1A, 1B, 1C, 1D, and 1E.

In one or more embodiments, the base (210) includes first protrusions (242) and second protrusions (244). Other embodiments may include a single set of protrusions, or more than two sets of protrusions, without departing from the disclosure. The first and the second protrusions (242, 244) enable different lean angles (298), which a user may select by placing the smartphone (290) to be supported by either the first protrusions (242) or the second protrusions (244). Referring to FIG. 2B, the lean angle (298) quantifies the deviation of the phone from an upright (vertical position). A lean angle (298) of 0° would correspond to a display of the smartphone (290) facing horizontally in a forward direction, whereas increasing lean angles would correspond to an increasingly upward facing display of the smartphone (290). In one or more embodiments, the geometry of the headset case, including the placement of the first and second protrusions (242, 244) is selected to enable a lean angle (298) in a range between 5° and 45°. For example, the first protrusions (242) may correspond to a lean angle of approximately 15°, and the second protrusions (244) may correspond to a lean angle of approximately 20°.

Figure 3A:
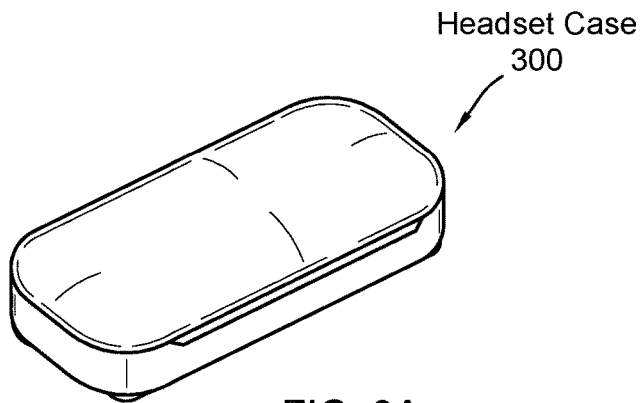
FIG. 3A shows a perspective view of a headset case in a closed configuration, in accordance with one or more embodiments of the disclosure.
Figure 3B:
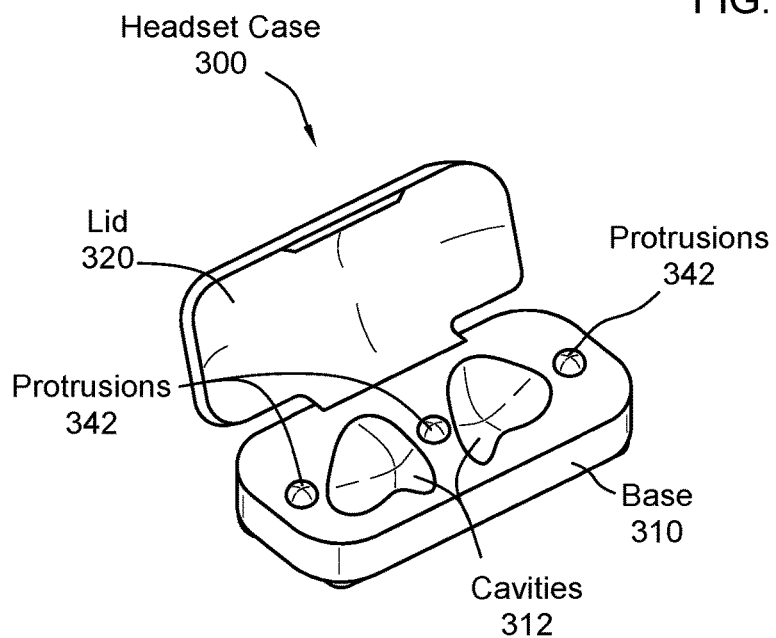
FIG. 3B shows a perspective view of a headset case in an open configuration, in accordance with one or more embodiments of the disclosure.
Figure 3C:
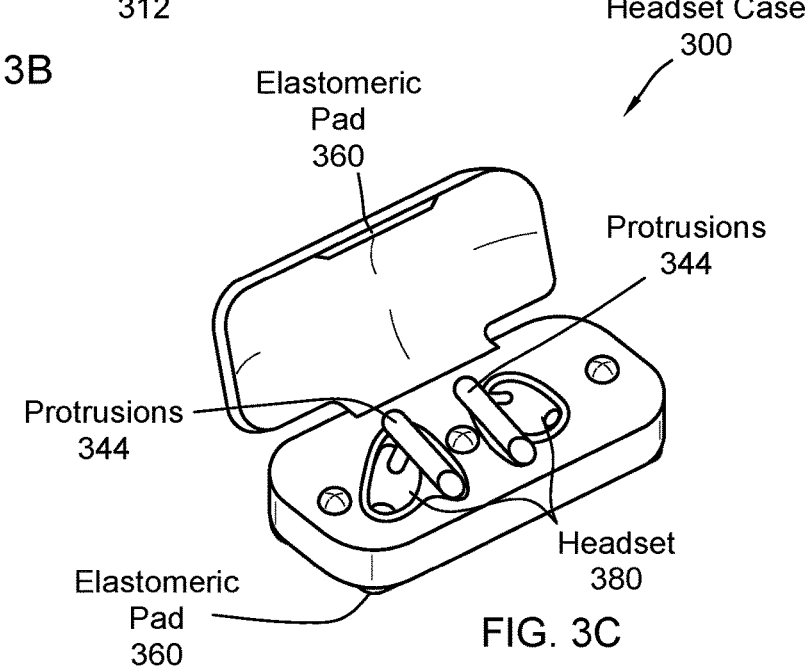
FIG. 3C shows a perspective view of a headset case in an open configuration with a headset stowed, in accordance with one or more embodiments of the disclosure.
Figure 3D:
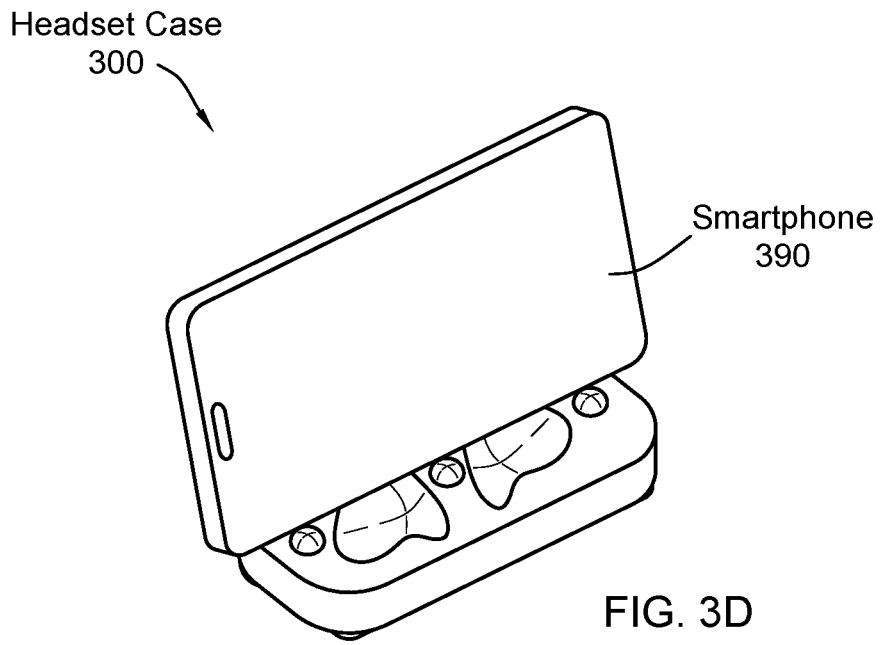
FIG. 3D shows a perspective view of a headset case supporting a smartphone, in accordance with one or more embodiments of the disclosure.
Figure 3E:
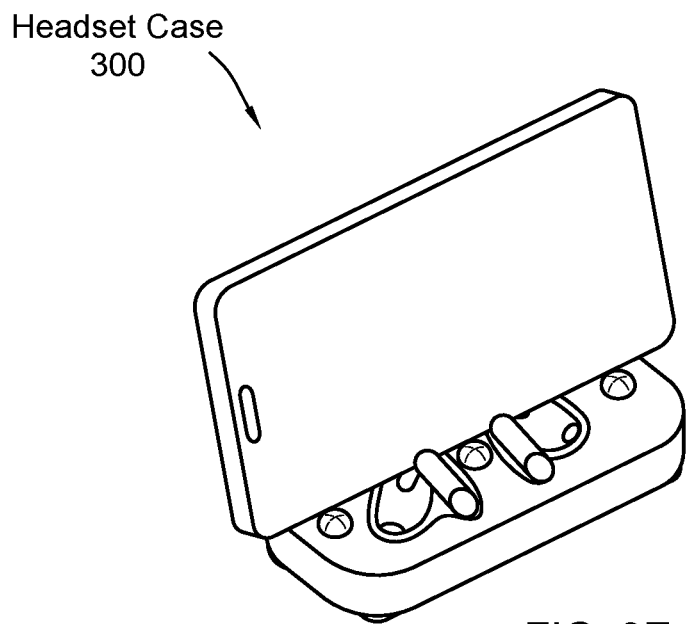
FIG. 3E shows a perspective view of a headset case with a headset stowed and supporting a smartphone, in accordance with one or more embodiments of the disclosure.

Turning to FIGS. 3A-3E, different views of a headset case (300), in accordance with one or more embodiments, are provided. FIG. 3A shows a perspective view of a headset case in a closed configuration, FIG. 3B shows a perspective view of a headset case in an open configuration, FIG. 3C shows a perspective view of a headset case in an open configuration with a headset stowed, FIG. 3D shows a perspective view of a headset case supporting a smartphone, and FIG. 3E shows a perspective view of a headset case with a headset stowed and supporting a smartphone.

Similar to the previously described headset case (100), the headset case (300) includes a base (310) and a lid (320) pivotably connected to the base (310) by a hinge (not shown). As previously described, the headset case (300) may be in an open configuration (FIGS. 3B, 3C, 3D, and 3E) or a closed configuration (FIG. 3A). The lid (320) may include a first section and a second section, as previously described for the embodiments of FIGS. 1A, 1B, 1C, 1D, and 1E.

In one or more embodiments, the base (310) includes protrusions (342). The protrusions (342), in the example, are provided by the molded cavity (312) for the headset (380). In the example, three protrusions (342) are provided to prop up a smartphone (390) in landscape and portrait orientations. The protrusions may have any shape. For example, the protrusions may be point-like, as shown, or alternatively, the protrusions may be in the shape of one or more ledges, etc. Further, protrusions (344), in the example, may be provided by the headset (380) itself, when the headset is stowed in the base (310), and with one or more elements of the headset protruding from the base. In the example, the headset (380) includes two earbuds, and the protrusions (344) are stems extending from the earpieces of the earbuds. Accordingly, when the headset (380) is inserted in the cavity (312), either the protrusions (342) or the protrusions (344) or a combination of the protrusions 342, 344) may prevent a sliding of the smartphone (390). In absence of the headset (380), the protrusions (342) alone may prevent a sliding of the smartphone (390). In one or more embodiments, the headset case (300) is equipped with elastomeric pads (360). Elastomeric pads (360) may be installed on the base (310) to increase friction between a surface and the base (310) resting on the surface. An elastomeric pad (360) may also be installed on the lid (320) to increase friction between the smartphone (390) and the lid (320). Other features of the headset case (300) may be as previously described.

Figure 4A:
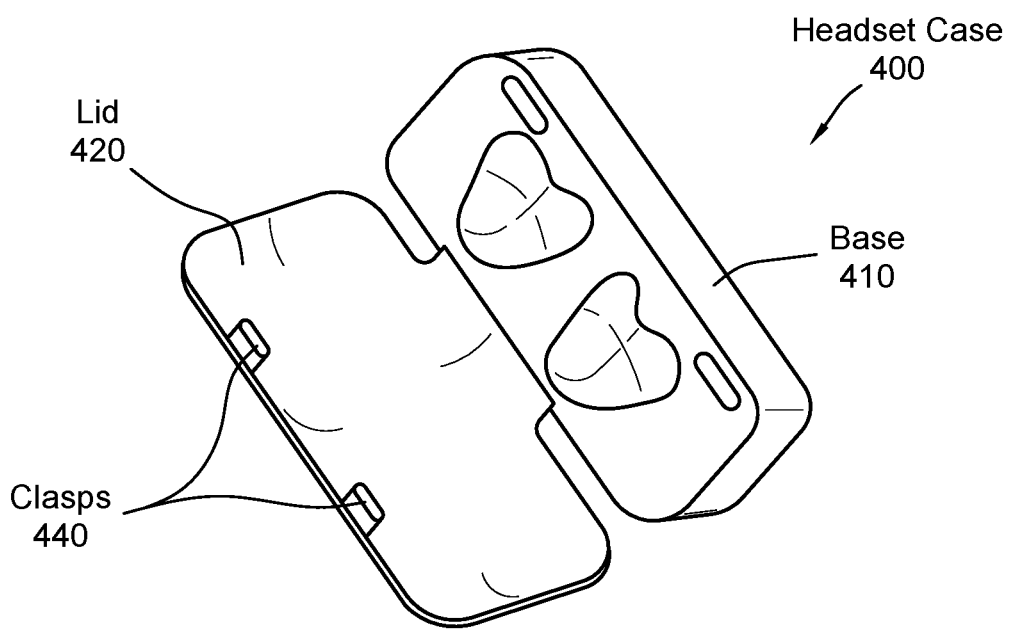
FIG. 4A shows a perspective view of a headset case in an open configuration, in accordance with one or more embodiments of the disclosure.
Figure 4B:
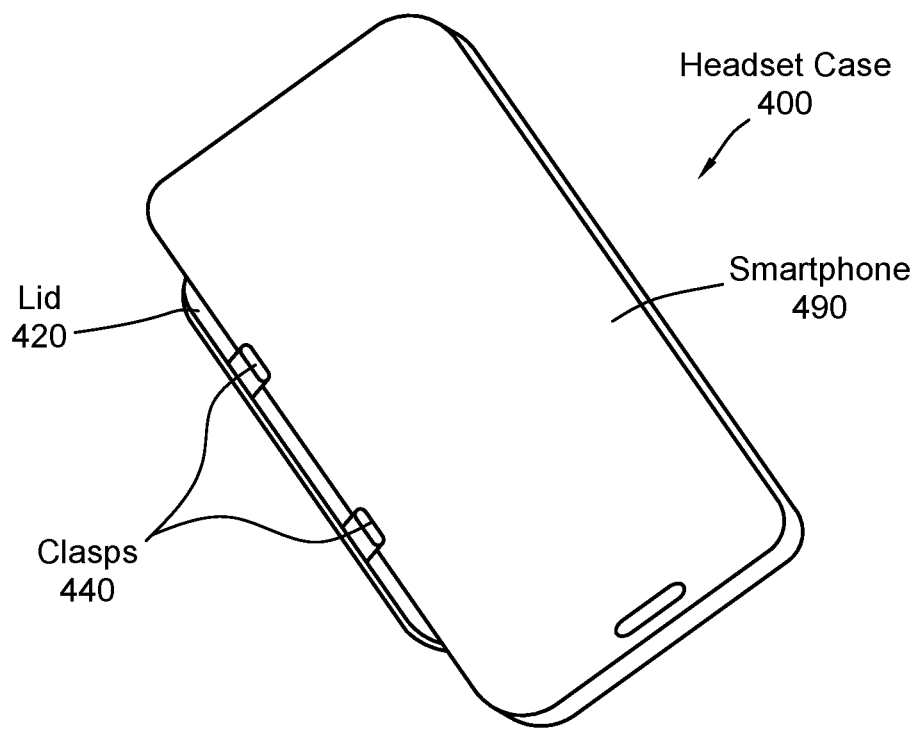
FIG. 4B shows a perspective view of a headset case supporting a smartphone, in accordance with one or more embodiments of the disclosure.

Turning to FIGS. 4A and 4B, different views of a headset case (400), in accordance with one or more embodiments, are provided. FIG. 4A shows a perspective view of a headset case in an open configuration, and FIG. 4B shows a perspective view of a headset case supporting a smartphone.

The headset case (400) is for stowing earbuds (not shown) and includes a base (410) and a lid (420). Unlike the previously presented embodiments in which a smartphone is supported, leaning against a lid of a headset case, in the headset case (400), the smartphone leans against the base (410). In other words, the role of base (410) and lid (420) is inverted when compared to the previously described embodiments. Further, the lid (420) includes clasps (440) that engage with the base (410) when the headset case (400) is in the closed configuration. When the headset case (400) is in the open configuration, the clasps (440) serve as mechanical features, preventing a forward sliding of the smartphone (490), propped up against the base (410).

Figure 5:
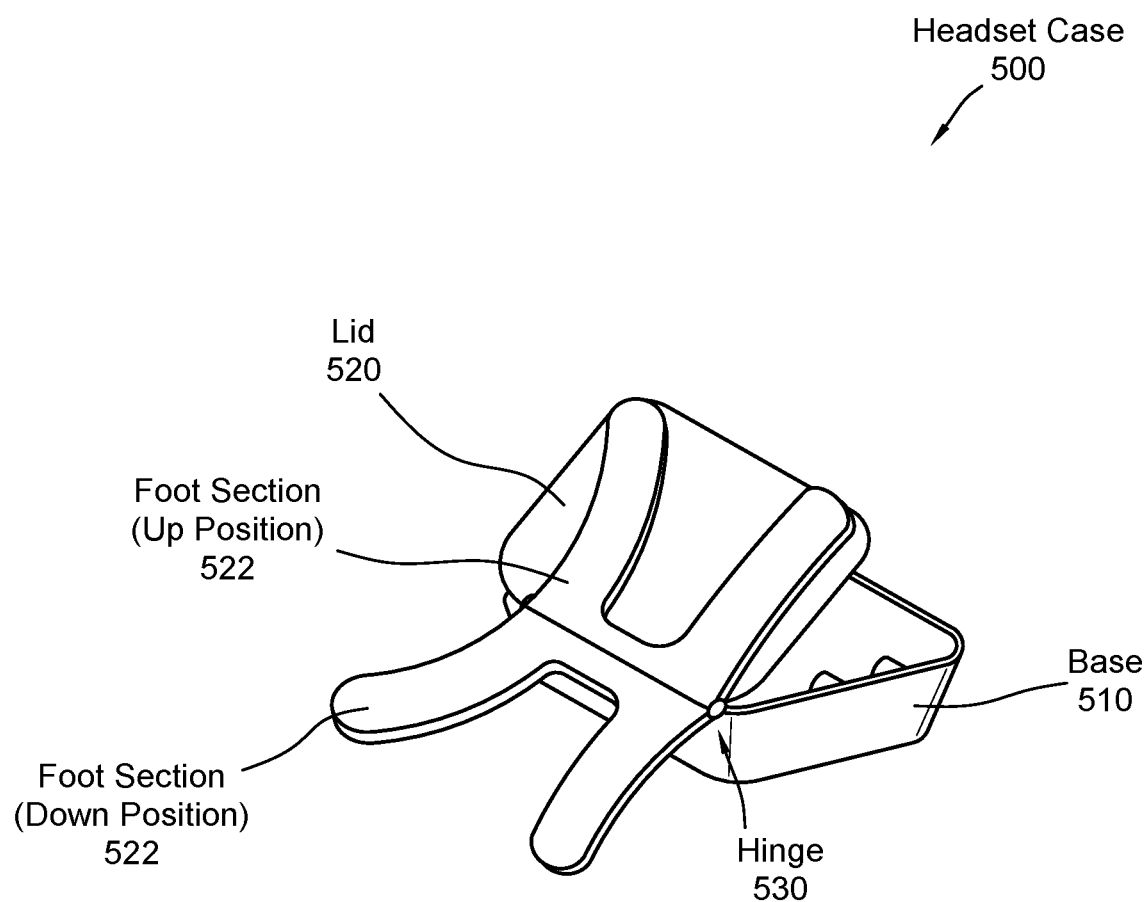
FIG. 5 shows a perspective view of a headset case in an open configuration, in accordance with one or more embodiments of the disclosure.

Turning to FIG. 5, a perspective view of a headset case in an open configuration, in accordance with one or more embodiments of the disclosure, is shown. Similar to the previously described headset case (100), the headset case (500) includes a base (510) and a lid (520) pivotably connected to the base (510) by a hinge (530). As previously described, the headset case (500) may be in an open configuration (shown in FIG. 5) or a closed configuration (not shown). In one or more embodiments, a portion of the lid (520) may form a foot section (522) that may fold using the hinge (530). In an up-position, shown in FIG. 5, the foot section (522) is integrating with the lid (520). For example, the foot section may be flush with the surface of the lid, or may rest on the surface of the lid. In a down-position, also shown in FIG. 5, the foot section (522) may rest on a supporting surface, to stabilize the headset case (500). Other elements of the headset case (500) may be similar to elements of the headset cases (100, 200, and 300).

While FIGS. 1A-1E, 2A-2C, 3A-3E, 4A, 4B, and 5 show configurations of components, other configurations may be used without departing from the scope of the disclosure. For example, while certain aspects are described in reference to certain figures, these aspects may be equally applicable to embodiments shown in other figures. Also, the headset cases as shown in the figures may be of any size and shape, and may be made of any material, e.g. plastic materials, alloys, and/or composite materials.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A headset case comprising:
   a base providing a cavity for stowing a headset, the base comprising a bottom region, opposite the cavity, the bottom region configured to rest on a surface;
   a lid comprising a first section and a second section, the second section connected to the first section; and
   a hinge pivotably connecting the first section of the lid to the base, the hinge located at the bottom region of the base,
      wherein when the headset case is in a closed configuration: the lid covers the cavity, and
      wherein when the headset case is in an open configuration:
         the first section of the lid and the bottom region of the base at least partially rest on the surface, and
         the second section of the lid, extending from the first section of the lid, is configured to prop up a smartphone by mechanically supporting the smartphone leaning against the second section of the lid while resting on the base.

2. The headset of claim 1,
   wherein the headset case is configured for the smartphone to lean against the second section of the lid at a lean angle selected to enable a user to view a display on a front of the smartphone, while the smartphone is supported by the headset case.

3. The headset of claim 2, wherein the lean angle is in a range between 5° and 45°, with the display facing in an upward direction toward the user.

4. The headset case of claim 1,
   wherein the base comprises a first stopper inhibiting a sliding of the smartphone on the base at a first lean angle.

5. The headset case of claim 4,
   wherein the first stopper comprises at least one protrusion, the at least one protrusion forming a mechanical barrier.

6. The headset case of claim 5,
   wherein the at least one protrusion comprises at least one ledge.

7. The headset case of claim 5, wherein the protrusion is an element of the headset stowed in the base and protruding from the base.

8. The headset case of claim 4,
   wherein the first stopper comprises a friction pad.

9. The headset case of claim 4,
   wherein the base further comprises a second stopper inhibiting the sliding of the smartphone on the base at a second lean angle.

10. The headset case of claim 1,
    wherein the hinge comprises a cam-spring mechanism to arrest the lid in the open configuration of the headset case.

11. The headset case of claim 1,
    wherein when the headset case is in the closed configuration: the first section of the lid forms a side wall of the cavity.

12. The headset case of claim 1, further comprising:
    at least one elastomeric pad disposed on the bottom region and configured to face the surface.

13. The headset case of claim 1, further comprising:
    at least one elastomeric pad disposed on the first section and configured to face the surface when the headset case is in the open configuration.

14. The headset case of claim 1, further comprising:
    a charging circuit for charging the headset.

15. A headset case comprising:
    a base providing a cavity for stowing a headset, the base comprising a bottom region configured to rest on a surface;
    a lid comprising a first section and a second section extending from the first section at an angle of less than 90°; and
    a hinge pivotably connecting the first section of the lid to the base, the hinge located at the bottom region of the base,
       wherein when the headset case is in a closed configuration:
          the lid covers the cavity, and
       wherein when the headset case is in an open configuration:
          the first section of the lid and the bottom region of the base at least partially rest on the surface, and
          the second section of the lid extends in an upward direction from the surface.

16. The headset case of claim 15,
    wherein the base comprises a stopper inhibiting a sliding of a smartphone on the base.

17. The headset case of claim 16,
    wherein the stopper comprises at least one protrusion, the at least one protrusion forming a mechanical barrier.

18. The headset case of claim 15,
    wherein when the headset case is in the closed configuration:
       the first section of the lid forms a side wall of the cavity.

19. A headset case comprising:
    a base providing a cavity for stowing a headset, the base comprising a plurality of ledges extending beyond the cavity, the base comprising a bottom region opposite the cavity, the bottom region configured to rest on a surface;
    a lid comprising a first section and a second section, the second section connected to the first section; and a hinge pivotably connecting the first section of the lid to the base, the hinge located at the bottom region of the base,
  wherein when the headset case is in a closed configuration:
    the lid covers the cavity, and
  wherein when the headset case is in an open configuration:
    the lid is configured to prop up a smartphone by mechanically supporting the smartphone leaning against the second section of the lid while resting on the base and in contact with the plurality of ledges, and
    the first section of the lid and the bottom region of the base at least partially rest on the surface.

20. The headset case of claim 19,
wherein the hinge comprises a cam-spring mechanism to arrest the lid in the open configuration of the headset case.

* * * * *